US011782307B2

United States Patent
Yu

(10) Patent No.: US 11,782,307 B2
(45) Date of Patent: Oct. 10, 2023

(54) BACKLIGHT MODULE OF DISPLAY DEVICE

(71) Applicant: AmTRAN Technology Co., Ltd., New Taipei (TW)

(72) Inventor: Hung-Ta Yu, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 0 days.

(21) Appl. No.: 17/662,843

(22) Filed: May 10, 2022

(65) Prior Publication Data

US 2023/0194921 A1    Jun. 22, 2023

(30) Foreign Application Priority Data

Dec. 22, 2021  (TW) ................................. 110148283
Mar. 28, 2022  (TW) ................................. 111111707

(51) Int. Cl.
*G02F 1/13357* (2006.01)
*G02F 1/1335* (2006.01)

(52) U.S. Cl.
CPC .. *G02F 1/133603* (2013.01); *G02F 1/133607* (2021.01)

(58) Field of Classification Search
CPC ......... G02F 1/133607; G02F 1/133603; G02F 1/133609; G02F 1/133611
See application file for complete search history.

(56) References Cited

U.S. PATENT DOCUMENTS

| 7,446,827 | B2 | 11/2008 | Ko et al. | |
| 7,719,635 | B2* | 5/2010 | Katsumoto | G02B 6/0053 349/95 |
| 9,291,852 | B2* | 3/2016 | Ryu | G02F 1/133606 |
| 2010/0033957 | A1* | 2/2010 | Lin | G02F 1/133606 362/97.2 |
| 2012/0162773 | A1* | 6/2012 | Kim | G02B 6/0065 359/599 |
| 2017/0004935 | A1* | 1/2017 | Wang | H01H 13/83 |
| 2019/0094619 | A1 | 3/2019 | Park et al. | |
| 2022/0269136 | A1* | 8/2022 | Boyd | G02F 1/133624 |

(Continued)

FOREIGN PATENT DOCUMENTS

| CN | 1888939 A | 1/2007 |
| CN | 101000387 A | 7/2007 |
| CN | 101630028 A | 1/2010 |

(Continued)

*Primary Examiner* — Julie A Bannan
(74) *Attorney, Agent, or Firm* — CKC & Partners Co., LLC

(57) ABSTRACT

A backlight module of a display device includes a carrier, a plurality of light-emitting diode chips and a first diffuser. The light-emitting diode chips are arranged on the carrier. The first diffuser is over the carrier and the light-emitting diode chips. The first diffuser includes a first substrate, a first prismatic structure and a plurality of first ink structures. The first substrate has an upper surface distal from the carrier. The first prismatic structure is at the upper surface of the first substrate. The first prismatic structure includes a first prismatic sub-structure and a second prismatic sub-structure, and the first prismatic sub-structure, the second prismatic sub-structure and the upper surface of the first substrate together define a gap. The first ink structures are in the gap and are in contact with the upper surface of the first substrate.

19 Claims, 14 Drawing Sheets

(56) References Cited

U.S. PATENT DOCUMENTS

2023/0038442 A1* 2/2023 Tsai .......................... F21V 9/14

FOREIGN PATENT DOCUMENTS

| CN | 103185912 | B | | 12/2014 |
|----|-----------|---|---|---------|
| CN | 111095088 | A | | 5/2020 |
| KR | 20070117077 | A | * | 12/2007 |
| KR | 20090033730 | A | | 4/2009 |
| KR | 100898100 | B1 | * | 5/2009 |
| KR | 20090075288 | A | | 7/2009 |
| TW | 200846774 | A | | 12/2008 |

* cited by examiner

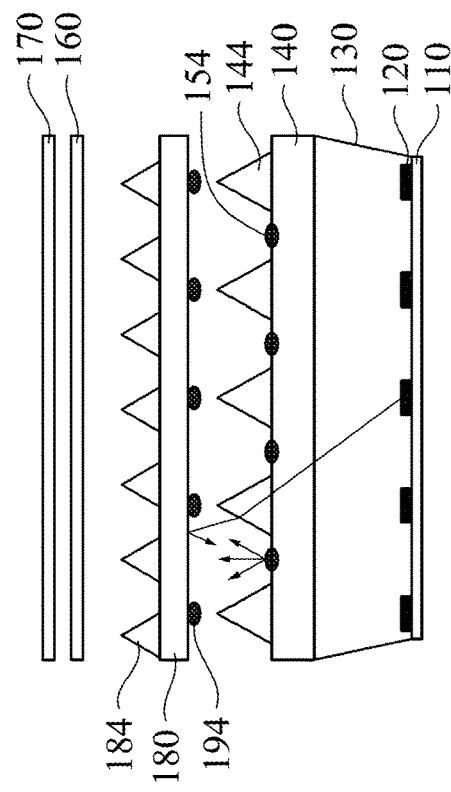
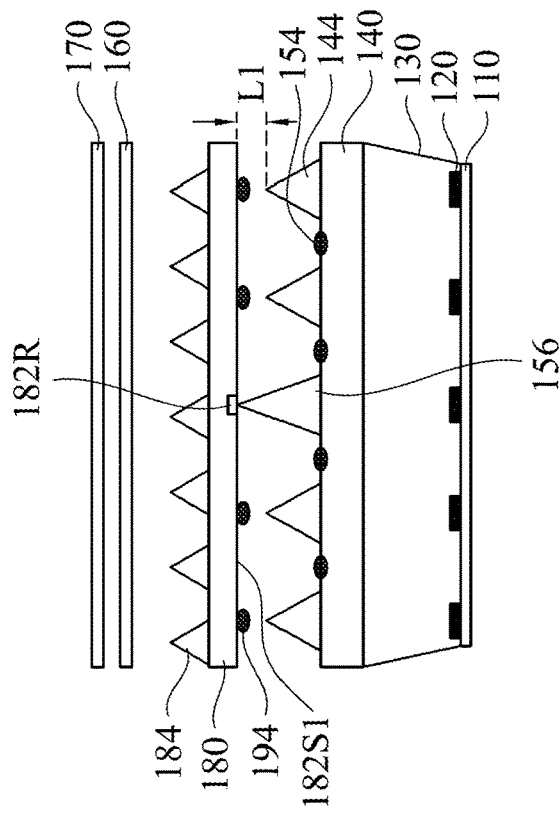
Fig. 14B
Fig. 14A

BACKLIGHT MODULE OF DISPLAY DEVICE

CROSS-REFERENCE TO RELATED APPLICATION

This application claims priority to Taiwan Application Serial Number 110148283, filed Dec. 22, 2021, and Taiwan Application Serial Number 111111707, filed Mar. 28, 2022, which are herein incorporated by reference in its entirety.

BACKGROUND

Field of Invention

The present disclosure relates to a backlight module of a display device. More particularly, the present disclosure relates to the backlight module of the display device with ink structures printed at certain locations of a diffuser.

Description of Related Art

With the resolutions of display devices increasing, a research direction is headed to improve light uniformity of the backlight modules within the display devices. There are several existed ways to improve light uniformity of backlight modules. For example, the amount of light-emitting diodes (LED) in the backlight modules may be increased to improve luminance coverages, such that the dark spots not overlapped by the light energies can be solved. Alternatively, the materials of the diffusers in the backlight modules may be modified to enhance the secondary diffusions of lights emitted by the light-emitting diodes. Recent trends of backlight modules is implementing mini LEDs as the light sources to increase light intensities. However, mini LED package structures do not include secondary optical lens to spread the emitted lights. Therefore, new light diffusion technique is required to improve the light distributions of such backlight modules.

SUMMARY

Some embodiments of the present disclosure provide a backlight module of a display including a carrier, a plurality of light-emitting diode chips and a first diffuser. The light-emitting diode chips are arranged on the carrier. The first diffuser is over the carrier and the light-emitting diode chips. The first diffuser includes a first substrate, a first prismatic structure and a plurality of first ink structures. The first substrate has an upper surface distal from the carrier. The first prismatic structure is at the upper surface of the first substrate. The first prismatic structure includes a first prism sub-structure and a second prism sub-structure, and the first prism sub-structure, the second prism sub-structure and the upper surface of the first substrate together define a gap. The first ink structures are in the gap and are in contact with the upper surface of the first substrate.

In some embodiments, the first prism sub-structure of the first prismatic structure has a first vertex protruding from the first substrate and a plurality of second vertices in contact with the upper surface of the first substrate, and the first ink structures are adjacent to at least one of the second vertices.

In some embodiments, the first prismatic structure further comprises a third prism sub-structure, a V-shaped recess is formed between the third prism sub-structure and the first prism sub-structure, and the third prism sub-structure and the first prism sub-structure are symmetrical with the V-shaped recess.

In some embodiments, the first ink structures are not in the V-shaped recess.

In some embodiments, the first prismatic structure has a plurality of surfaces inclined with respect to the upper surface of the first substrate, and the first ink structures are not on the surfaces.

In some embodiments, the backlight module further comprises a second diffuser over the first diffuser. The second diffuser comprises a second substrate and a plurality of second ink structures at a bottom surface of the second substrate facing the first diffuser. The first prism sub-structure and the second prism sub-structure of the first diffuser have first vertices protruding from the first substrate respectively, and the second ink structures are directly over the first vertices of the first prism sub-structure and the second prism sub-structure respectively.

In some embodiments, the second diffuser further includes a second prismatic structure, the second prismatic structure includes a plurality of fourth prism sub-structures arranged at an upper surface of the second substrate, the upper surface of the second substrate is distal from the first diffuser. Each of the fourth prism sub-structures includes a third vertex protruding from the upper surface of the second substrate and a plurality of fourth vertices in contact with the upper surface of the second substrate.

In some embodiments, a size of the first prism sub-structure of the first diffuser is larger than a size of any of the fourth prism sub-structures of the second diffuser.

In some embodiments, the first diffuser further includes a supporting structure on the upper surface of the first substrate and adjacent to the first prismatic structure, and a height of the supporting structure is greater than that of the first prismatic structure.

In some embodiments, a first weight percentage of $TiO_2$ in the first ink structures in the gap of the first diffuser is lower than a second weight percentage of $TiO_2$ in the second ink structures at the bottom surface of the second substrate.

In some embodiments, the backlight module further includes a wavelength conversion film over the first diffuser and an optical film over the wavelength conversion film.

Some embodiments of the present disclosure provide a display device including a display panel, a back plate and a backlight module accommodated in a space formed by the display panel and the back plate. The backlight module includes a carrier, a plurality of light-emitting diode chips arranged on the carrier and a first diffuser over the carrier and the light-emitting diode chips. The first diffuser includes a first substrate, a first prismatic structure and a plurality of first ink structures. The first substrate has an upper surface distal from the carrier. The first prismatic structure is at the upper surface of the first substrate, and the first prismatic structure includes a first prismatic sub-structure and a second prismatic sub-structure, and the first prismatic sub-structure, the second prismatic sub-structure and the upper surface of the first substrate together define a gap. The first ink structures are in the gap and in contact with the upper surface of the first substrate.

In some embodiments, the display device further includes a second diffuser over the first diffuser, and the second diffuser includes a second substrate and a plurality of second ink structures at a bottom surface of the second substrate facing the first diffuser. The first prismatic sub-structure and the second prismatic sub-structure of the first diffuser have first vertices protruding from the first substrate respectively, and the second ink structures are directly over the first vertices of the first prismatic sub-structure and the second prismatic sub-structure respectively.

In some embodiments, the first ink structures include rutile $TiO_2$, anatase $TiO_2$ or combinations thereof.

In some embodiments, the first prismatic structure has a plurality of surfaces inclined with respect to the upper surface of the first substrate, and the first ink structures are not on the surfaces.

Some embodiments of the present disclosure provide a diffuser set including a first diffuser. The first diffuser includes a first substrate, a first prismatic structure and a plurality of first ink structures. The first substrate has an upper surface. The first prismatic structure is at the upper surface of the first substrate, and the first prismatic structure includes a first prismatic sub-structure and a second prismatic sub-structure, and the first prismatic sub-structure, the second prismatic sub-structure and the upper surface of the first substrate together define a gap. The first ink structures are in the gap and in contact with the upper surface of the first substrate.

In some embodiments, the diffuser set further includes a second diffuser over the first diffuser. The second diffuser includes a second substrate and a plurality of second ink structures at a bottom surface of the second substrate facing the first diffuser. The first prismatic sub-structure and the second prismatic sub-structure of the first diffuser have first vertices protruding from the first substrate respectively, and the second ink structures are directly over the first vertices of the first prismatic sub-structure and the second prismatic sub-structure respectively.

In some embodiments, a first weight percentage of $TiO_2$ in the first ink structures in the gap of the first diffuser is lower than a second weight percentage of $TiO_2$ in the second ink structures at the bottom surface of the second substrate.

In some embodiments, the first prismatic structure of the first diffuser and the second diffuser are kept in a distance.

In some embodiments, the first ink structures comprise rutile $TiO_2$, anatase $TiO_2$ or combinations thereof.

As mentioned above, the ink structures on the diffuser are printed at certain locations to reach better effect of light mixing. Therefore, uniformity of images of the display is improved. Moreover, the usage of light-emitting diode chips in the display may also be reduced.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows:

FIG. 14A illustrates the relative position of the first diffuser and the second diffuser.

FIGS. 14B-14D illustrate the paths of light of the light-emitting diode chips in the backlight module of the display.

DETAILED DESCRIPTION

Some embodiments of the present disclosure are disclosed in following figures. Several practical details will be described in the following description for clearness. However, a person having ordinary skill in the art should know that these practical details may not be necessary in other embodiments of the present disclosure and should not be used to limit the present disclosure. Moreover, some known and common structures and components are illustrated in simple ways for simplicity of figures.

A display device in some embodiments of the present disclosure includes a backlight module with a diffuser having ink structures. In some embodiments of the present disclosure, the ink structures are printed at certain locations on the diffuser to provide better light mixing effect. Therefore, luminance uniformity of images displayed by the display device can be improved. Moreover, the amount of light-emitting diode chips in the backlight modules of the display devices may also be reduced.

Figure 1:
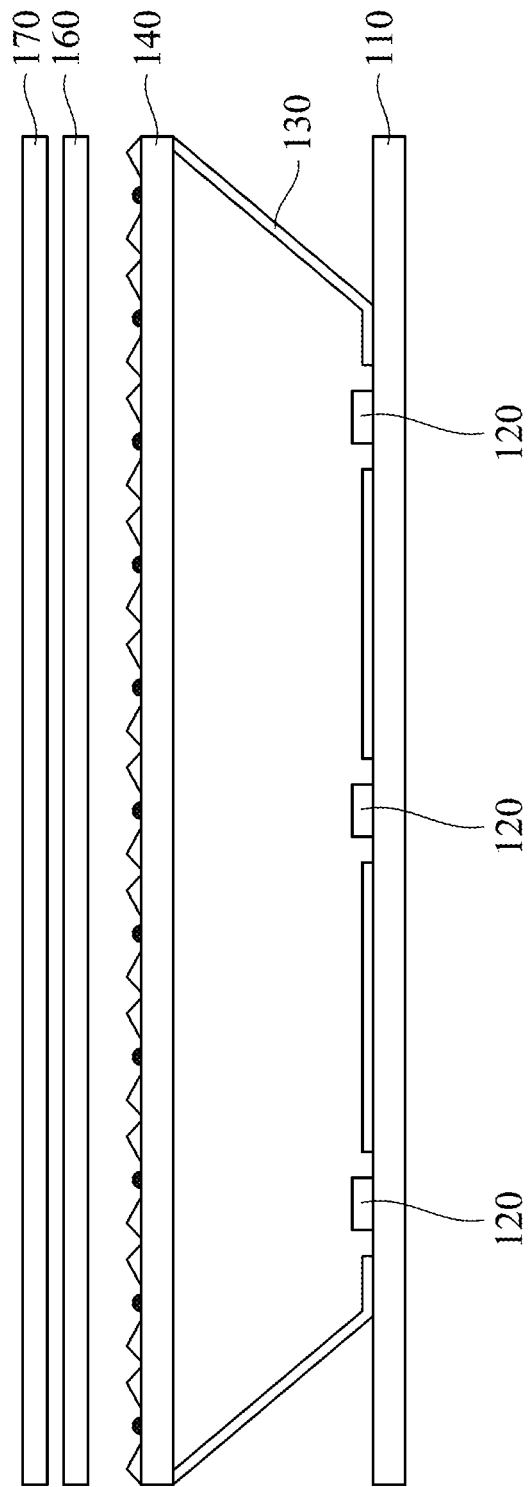
FIG. 1 illustrates a side view of a backlight module of a display in some embodiments of the present disclosure.

FIG. 1 illustrates a side view of a backlight module 100 of the display device in some embodiments of the present disclosure, and the backlight module 100 of the display device is accommodated in a space formed by a display panel and a back plate or a frame, which are not shown in FIG. 1. The backlight module 100 of the display device may include a carrier 110, a plurality of light-emitting diode chips 120, a reflector 130, a first diffuser 140, a wavelength conversion film 160 and an optical film 170. The light-emitting diode chips 120 are arranged on the carrier 110. The first diffuser 140 is disposed over the carrier 110, the light-emitting diode chips 120 and the reflector 130. The reflector 130 is disposed over the carrier 110 and the light-emitting diode chips 120 and under the first diffuser 140. The wavelength conversion film 160 is over the first diffuser 140. The optical film 170 is over the wavelength conversion film 160. The backlight module 100 of the display device serves as a light source of the display panel which provides required brightness of the display images to the display panel, such that the display panel is able to display the display images to the users watching the display device.

Figure 2:
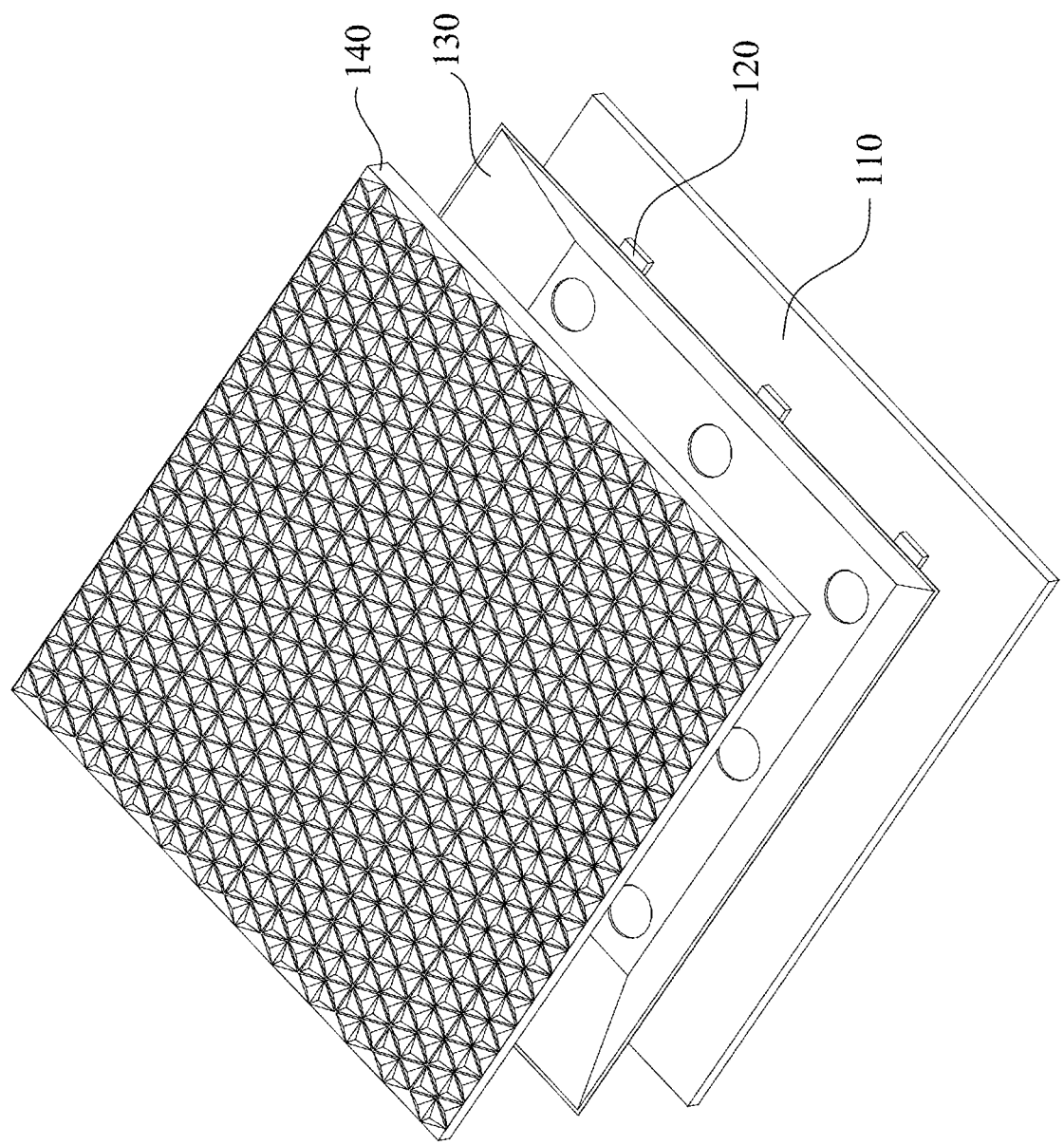
FIG. 2 illustrates an exploded view of the carrier, the light-emitting diode chips, the reflector and the first diffuser of the backlight module of the display in some embodiments of the present disclosure.

FIG. 2 illustrates an exploded view of the backlight module 100, including the carrier 110, the light-emitting diode chips 120, the reflector 130 and the first diffuser 140, in the display device according to some embodiments of the present disclosure. The carrier 110 may be a printed circuit board. The light-emitting diode chips 120 are arranged on the carrier 110. In some embodiments, the light-emitting diode chips 120 are mini LEDs, micro LEDs or other miniaturized LED chips. The light-emitting diode chips 120 are arranged on the carrier 110 in any suitable form of package, such as chip on board (COB) or package on board (POB). The light-emitting diode chips 120 may be arranged on the carrier 110 in array. In some embodiments, the light-emitting diode chips 120 may emit blue light, and the blue light may be converted into white light by the wavelength conversion film 160 (see FIG. 1). The reflector 130 is disposed over or around the light-emitting diode chips 120. In some embodiments, the reflector 130 has a bottom surface and sidewall portions surrounding the bottom surface. The bottom surface has a plurality of holes corresponding to the locations of the light-emitting diode chips 120, such that the light-emitting diode chips 120 are exposed in the holes and the emitted light is not reflected back toward the carrier by the reflector 130. The sidewall portions of the reflector 130 is configured to reflect the light emitted by the light-emitting diode chips 120 upwardly in order to ensure all emitted light passing through the first diffuser 140. In some embodiments, the reflector 130 is formed of polyethylene terephthalate (PET), and the reflectivity is higher than 99%.

Figure 3:
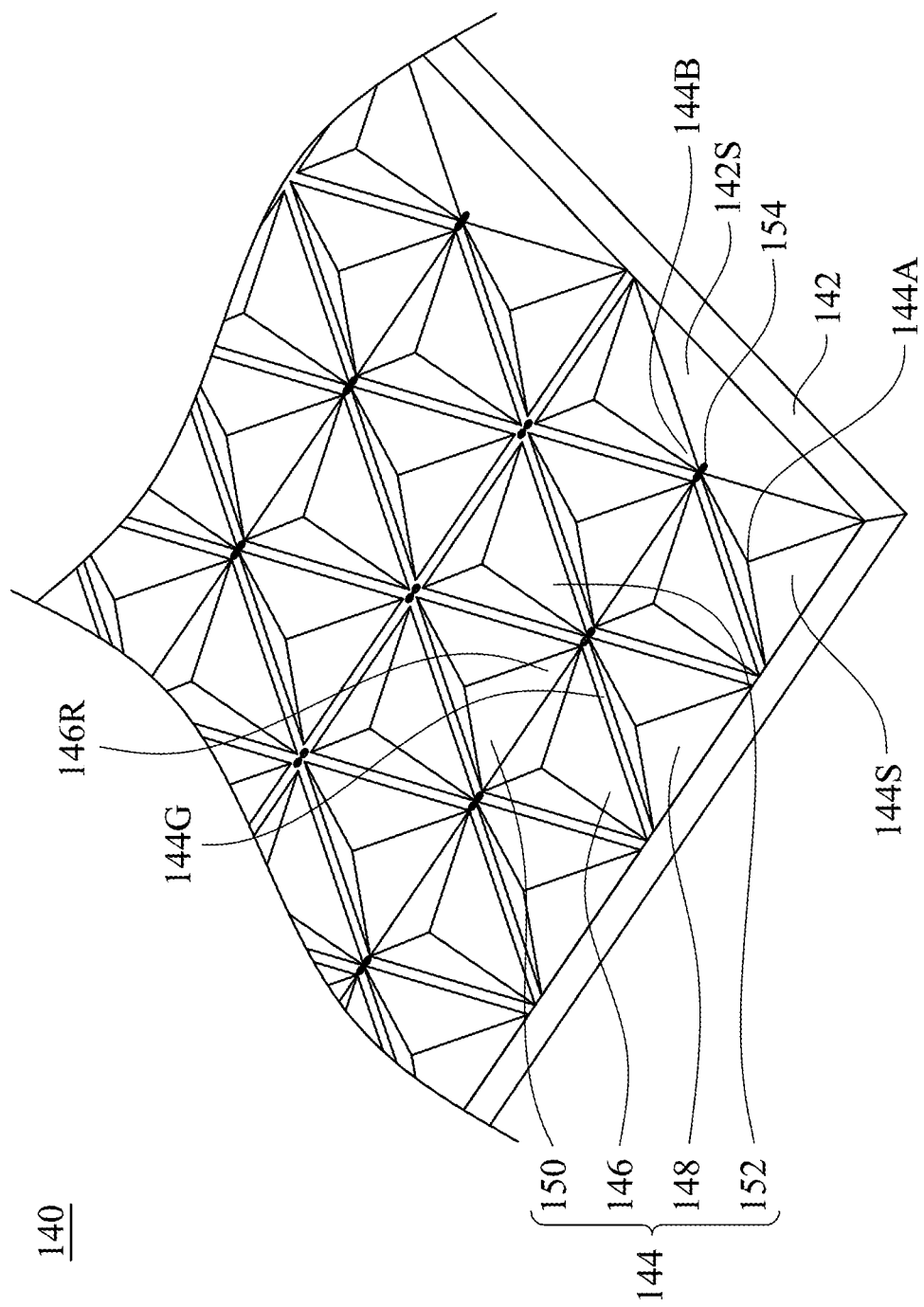
FIG. 3 illustrates a perspective view of the first diffuser in some embodiments of the present disclosure.
Figure 4:
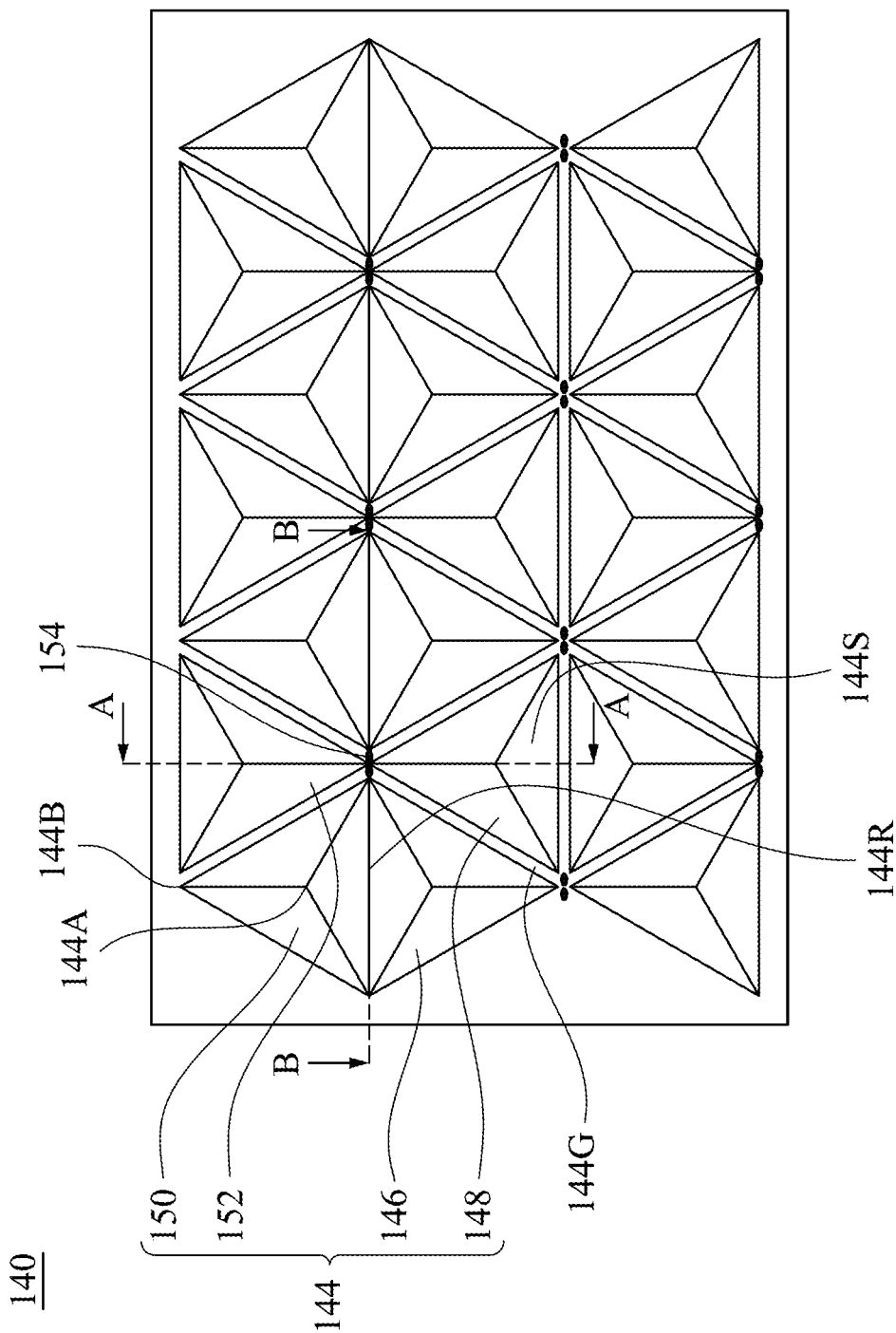
FIG. 4 illustrates a top view of the first diffuser in some embodiments of the present disclosure.

The first diffuser 140 is disposed over the reflector 130 and is configured to diffuse the light emitted by light-emitting diode chips 120 in order to improve the luminance uniformity of the displayed images. The detailed structure of the first diffuser 140 is referred to FIGS. 3-4. FIG. 3 illustrates a perspective view of the first diffuser 140 in some embodiments of the present disclosure, and FIG. 4 illustrates a top view of the first diffuser 140 in some embodiments of the present disclosure. The first diffuser 140 includes a first substrate 142, a first prismatic structure 144 and a plurality of first ink structures 154. The first substrate 142 is a flat plate and has an upper surface 142S distal from the carrier 110. That is, the upper surface 142S of the first substrate 142 does not face the carrier 110 but faces the direction away from the carrier 110.

The first prismatic structure 144 is disposed on the upper surface 142S of the first substrate 142. The first prismatic structure 144 includes a first prismatic sub-structure 146, a second prismatic sub-structure 148, a third prismatic sub-structure 150 and a fourth prismatic sub-structure 152. Each prismatic sub-structure of the first prismatic structure 144, such as the first prismatic sub-structure 146, the second prismatic sub-structure 148, the third prismatic sub-structure 150 and the fourth prismatic sub-structure 152, has a plurality of surfaces 144S inclined with respect to the upper surface 142S of the first substrate 142. Moreover, the first prismatic sub-structure 146, the second prismatic sub-structure 148, the third prismatic sub-structure 150 and the fourth prismatic sub-structure 152 of the first prismatic structure 144 have a first vertex 144A protruding from the first substrate 142 respectively, such as the vertices of the prismatic sub-structures, and a plurality of the second vertices 144B in contact with the upper surface 142S of the first substrate 142. In particular, the surfaces 144S of any prismatic sub-structures in the first prismatic structure 144 intersect at top and define the first vertex 144A protruding upwards, and each two adjacent surfaces 144S of any prismatic sub-structures intersect at bottom and define the second vertex 144B at the upper surface 142S of the first substrate 142.

The first prismatic sub-structure 146, the second prismatic sub-structure 148 and the upper surface 142S of the first substrate 142 together define a gap 144G. A V-shaped recess 144R is formed between the third prismatic sub-structure 150 and the first prismatic sub-structure 146, and as shown in FIG. 4, the third prismatic sub-structure 150 and the first prismatic sub-structure 146 are symmetrical with respect to the V-shaped recess 144R. Stated another way, the surface 144S of the first prismatic sub-structure 146 and the surface 144S of the second prismatic sub-structure 148 are not in physical contact with each other, but both connect to the upper surface 142S of the first substrate 142. Therefore, the gap 144G is between the first prismatic sub-structure 146 and the second prismatic sub-structure 148, and the bottom of the gap 144G is the upper surface 142S of the first substrate 142. Stated another way, the bottom of the gap 144G is a flat surface. Moreover, the surface 144S of the first prismatic sub-structure 146 and the surface 144S of the third prismatic sub-structure 150 are in direct contact with each other. Therefore, the V-shaped recess 144R is formed between the first prismatic sub-structure 146 and the third prismatic sub-structure 150, and the V-shaped recess 144R does not expose the upper surface 142S of the first substrate 142. Stated another way, the V-shaped recess 144R does not have a flat surface bottom but just a V groove. Therefore, the distance between the first prismatic sub-structure 146 and the second prismatic sub-structure 148 is greater than the distance between the first prismatic sub-structure 146 and the third prismatic sub-structure 150. Moreover, the gap 144G is also between the third prismatic sub-structure 150 and the fourth prismatic sub-structure 152, and the fourth prismatic sub-structure 152 and the second prismatic sub-structure 148 are symmetrical with respect to the line B-B. The distance between the third prismatic sub-structure 150 and the fourth prismatic sub-structure 152 is greater than the distance between the first prismatic sub-structure 146 and the third prismatic sub-structure 150.

In some embodiments, the first prismatic sub-structure 146, the second prismatic sub-structure 148, the third prismatic sub-structure 150 and the fourth prismatic sub-structure 152 may be combined into a prismatic sub-structure unit, which can be arranged in a 2-D array as shown in FIGS. 3 and 4 and forms the first prismatic structure 144. Moreover, every prismatic sub-structure unit is separated from each other by a distance, such as by the gap 144G between therein.

In some embodiments, the first diffuser 140 is formed of translucent materials which may be rolled by precision roller to form the first prismatic structure 144 thereon. Therefore, the light emitted from the underneath light-emitting diode chips 120 can be diffused through the first diffuser 140 and further refracted by the first prismatic structure 144. In some embodiments, the translucent material of the first diffuser 140 is doped with diffusing agents or particles. Details of the transmission path of the light in the first diffuser 140 will be described in FIGS. 14A-14D.

The first ink structures 154 are located in the gap 144G and in contact with the upper surface 142S of the first substrate 142. The first ink structures 154 may be at any suitable locations in the gap 144G. In some embodiments, the first ink structures 154 are adjacent to at least one of the second vertices 144B of the first prismatic sub-structure 146, the second prismatic sub-structure 148, the third prismatic sub-structure 150, or the fourth prismatic sub-structure 152 as shown in FIG. 4. When the first ink structures 154 are close to the second vertices 144B, the light of the light-emitting diode chips 120 traveling to second vertices 144B can be effectively reflected as shown in FIGS. 14B and 14C.

In some other embodiments, the first ink structures 154 may also be arranged along the edges of the first prismatic sub-structure 146, the second prismatic sub-structure 148, the third prismatic sub-structure 150 or the fourth prismatic sub-structure 152 on the upper surface 142S of the first substrate 142 to increase the light reflection and scattering efficiency. Stated another way, the first ink structures 154 are not located in the V-shaped recess 144R or on the surfaces 144S of the prismatic sub-structures of the first prismatic structure 144. Therefore, the light of the light-emitting diode chips 120 may pass through the prismatic sub-structures of the first prismatic structure 144.

In some embodiments, the first ink structures 154 may be formed by printing ink to specific locations on the upper surface 142S of the first substrate 142. In some embodiments, the ink may include $TiO_2$. Therefore, the first ink structures 154 may also include $TiO_2$. More specifically, the first ink structures 154 may include rutile $TiO_2$, anatase $TiO_2$ or combinations thereof. The first ink structures 154 including $TiO_2$ provide high reflectance to the blue light. After the blue light of the light-emitting diode chips 120 is refracted from the first diffuser 140 and enters into the wavelength conversion film 160 disposed above the first diffuser 140, a small amount of the refracted blue light will be reflected by the wavelength conversion film 160 back to the first diffuser 140. The first ink structures 154 to reflect blue light can reflect the reflected blue light back to wavelength conversion film 160. Therefore, the blue light which does not enter into the wavelength conversion film 160 directly can be scattered and reflected between the first diffuser 140 and the wavelength conversion film 160, which provides better light mixing efficiency.

Moreover, $TiO_2$ exhibits strong absorbance of violet and ultraviolet light. Therefore the absorbance of violet and ultraviolet light of the first ink structures 154 or the first diffuser 140 may be adjusted by changing the weight percentage of $TiO_2$ in the first ink structures 154 or the first diffuser 140. Such implementation can improve the purity of the output blue light, which enhances the color performance of the light after passing through and being converted by the wavelength conversion film 160. The damage caused by the light from the display device to human's eye can also be reduced. In some embodiments, the weight percentage of $TiO_2$ in the first ink structures 154 disposed on the first diffuser 140 is from 0.01% to 0.1%. If the weight percentage of $TiO_2$ in the first ink structures 154 is not within the disclosed range, the amount of $TiO_2$ in the first ink structures 154 may be insufficient to reflect the light of the light-emitting diode chips 120, or the amount of $TiO_2$ in the first ink structures 154 may be too much to cause insufficient light transmittance.

Figure 6:
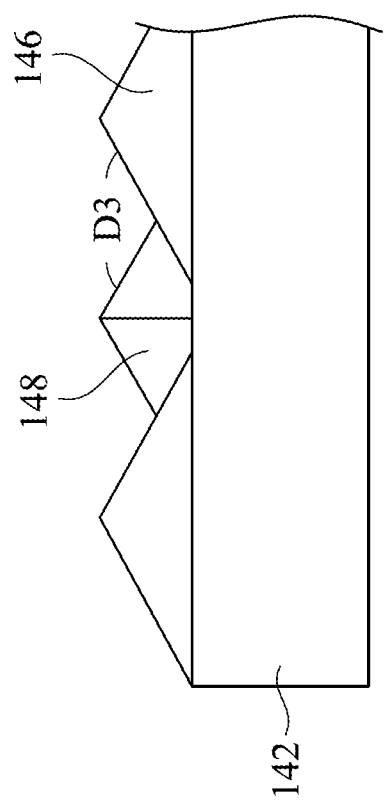
FIG. 6 illustrates the cross-section view of the first prismatic structure taken along line B-B in FIG. 4.
Figure 5:
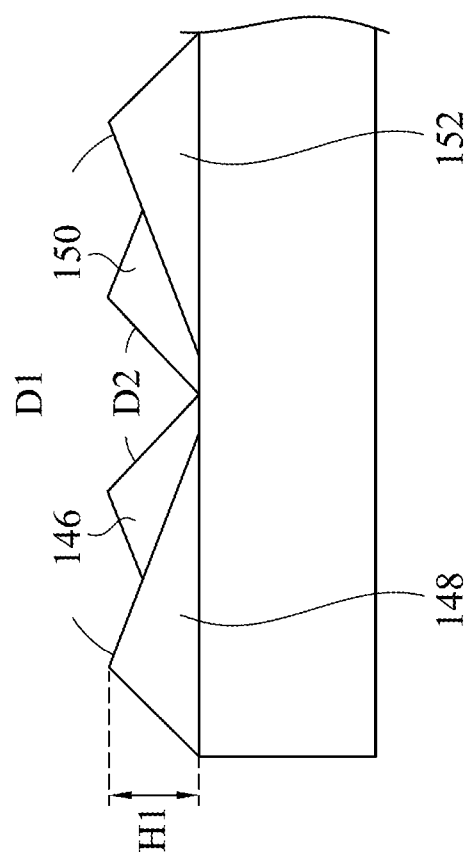
FIG. 5 illustrates the cross-section view of the first prismatic structure taken along line A-A in FIG. 4.

FIGS. 5-6 illustrate cross-section views of the first prismatic structure 144 in some embodiments of the present disclosure. FIG. 5 illustrates the cross-section view of the first prismatic structure 144 taken along line A-A in FIG. 4. FIG. 6 illustrates the cross-section view of the first prismatic structure 144 taken along line B-B in FIG. 4. It is noted that the first ink structures 154 are not illustrated in FIGS. 5 and 6 for simplicity. In FIG. 5, an angle D1 is between the opposite sides of the adjacent second prismatic sub-structure 148 and fourth prismatic sub-structure 152, and an angle D2 is between the opposite sides of the adjacent first prismatic sub-structure 146 and third prismatic sub-structure 150. In FIG. 6, an angle D3 is between the adjacent sides of the first prismatic sub-structure 146 and second prismatic sub-structure 148 which are overlapped in the side view. The angle D1, D2 and D3 may be from about 90 degree to about 130 degree. If the angle D1, D2 and D3 are within the disclosed range about 90 to 130 degree, the first diffuser 140 can provide refractions with better light energy distribution effect. In addition, the first prismatic sub-structure 146, the second prismatic sub-structure 148, the third prismatic sub-structure 150 and the fourth prismatic sub-structure 152 have a height H1 between about 0.3 mm and about 0.5 mm.

Turning back to FIG. 1, the wavelength conversion film 160 in the backlight module 100 of the display device is disposed over the first diffuser 140. Wavelength conversion materials such as quantum dots or phosphors are filled in the wavelength conversion film 160 to convert the light from the light-emitting diode chips 120 into the light with different wavelengths. For example, the wavelength conversion film 160 may include red quantum dots that convert blue light into red light and green quantum dots that convert blue light into green light. After the light of the light-emitting diode chips 120 passes through the first diffuser 140 and enters into the wavelength conversion film 160, the red light and green light generated by wavelength conversion are mixed with the blue light to generate the white light. In addition, the optical film 170 is disposed over the wavelength conversion film 160. In some embodiments, the optical film 170 may be prism sheet, diffuser, micro lens film, dual brightness enhancement film (DBEF), composite film structures or multiple films.

Figure 7:
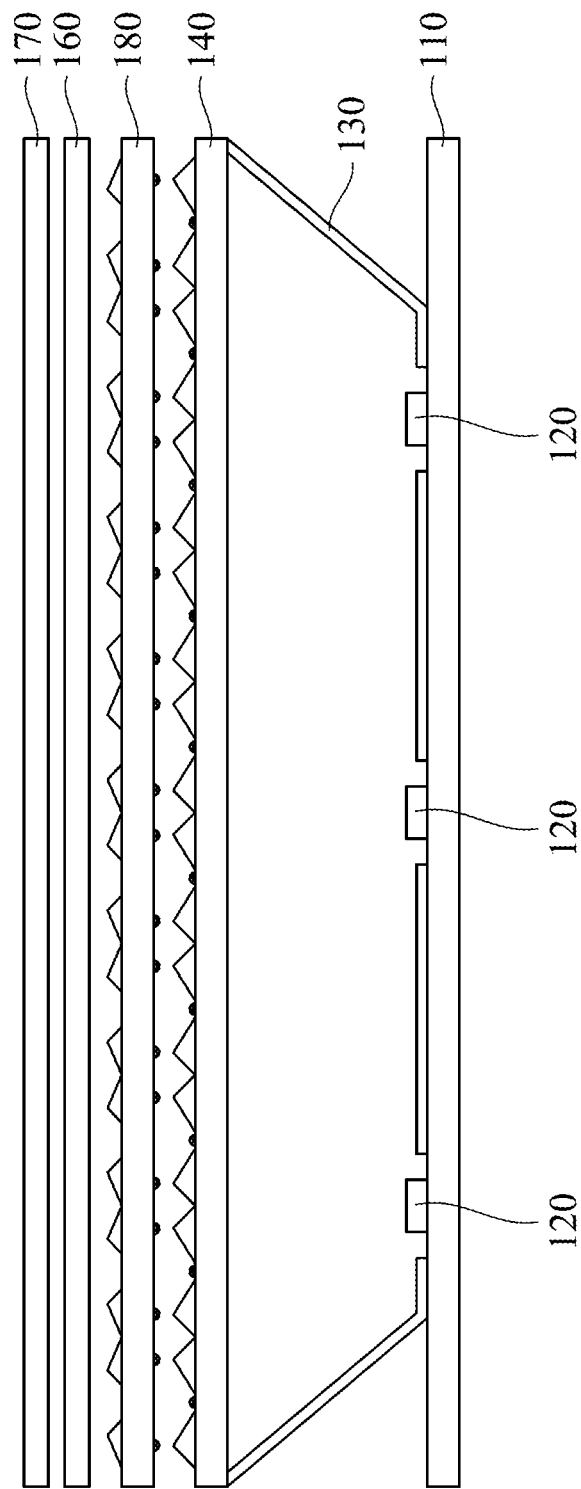
FIG. 7 illustrates a side view of a backlight module of the display in some embodiments of the present disclosure.
Figure 8:
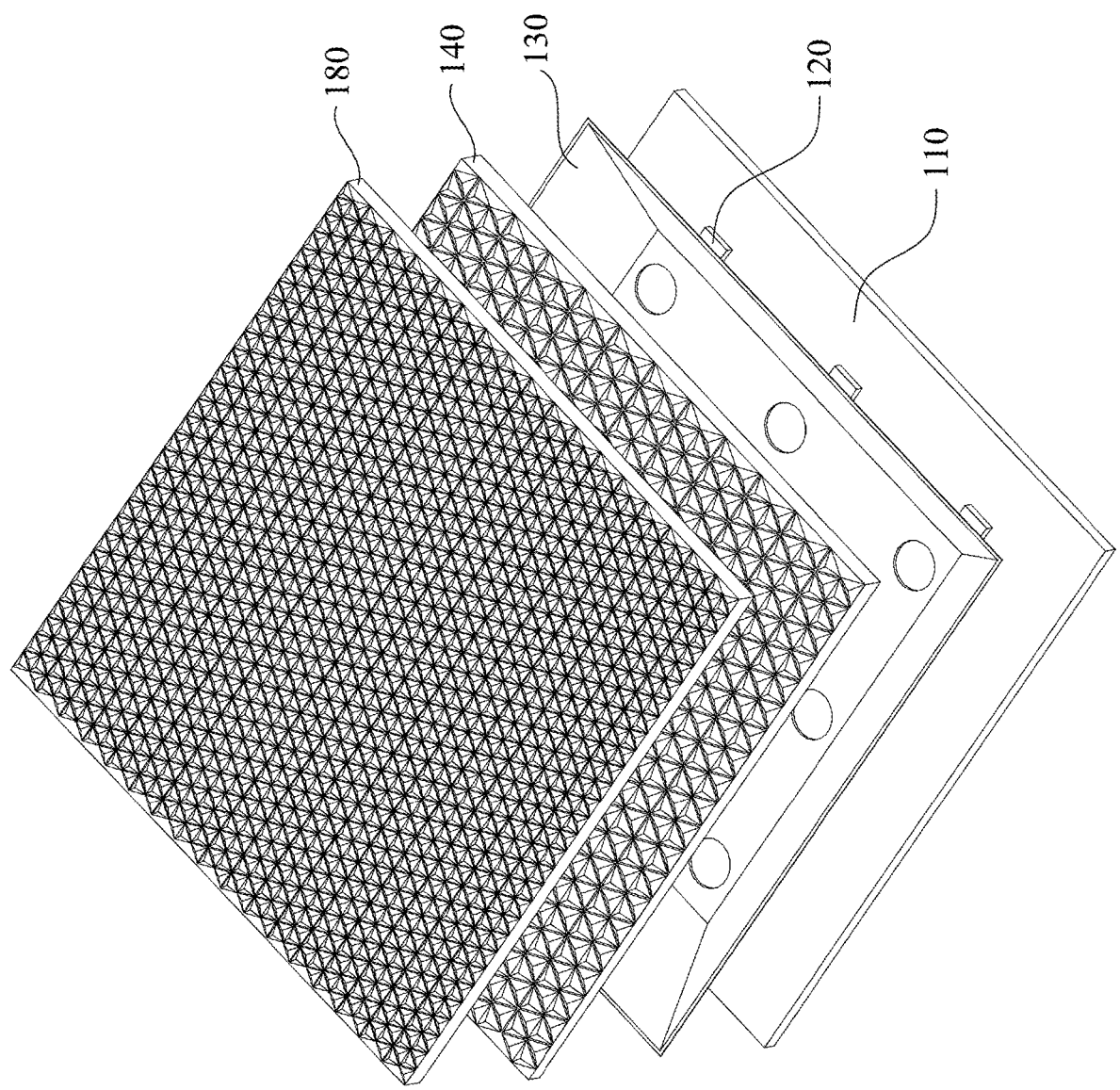
FIG. 8 illustrates an exploded view of the carrier, the light-emitting diode chips, the reflector, the first diffuser and the second diffuser of the backlight module of the display in some embodiments of the present disclosure.

FIG. 7 illustrates a side view of a backlight module 200 in the display device according to some embodiments of the present disclosure. FIG. 8 illustrates an exploded view of a portion of the backlight module 200 in the display device according to some embodiments of the present disclosure. The difference between the backlight module 200 and the backlight module 100 of the display devices is that the backlight module 200 of the display device further includes a second diffuser 180. The second diffuser 180 is disposed over the first diffuser 140 and under the wavelength conversion film 160. Other components of the backlight module 200 in the display device are similar to or same as the backlight module 100 in the display device. Therefore, related details are not repeatedly described herein.

Figure 9:
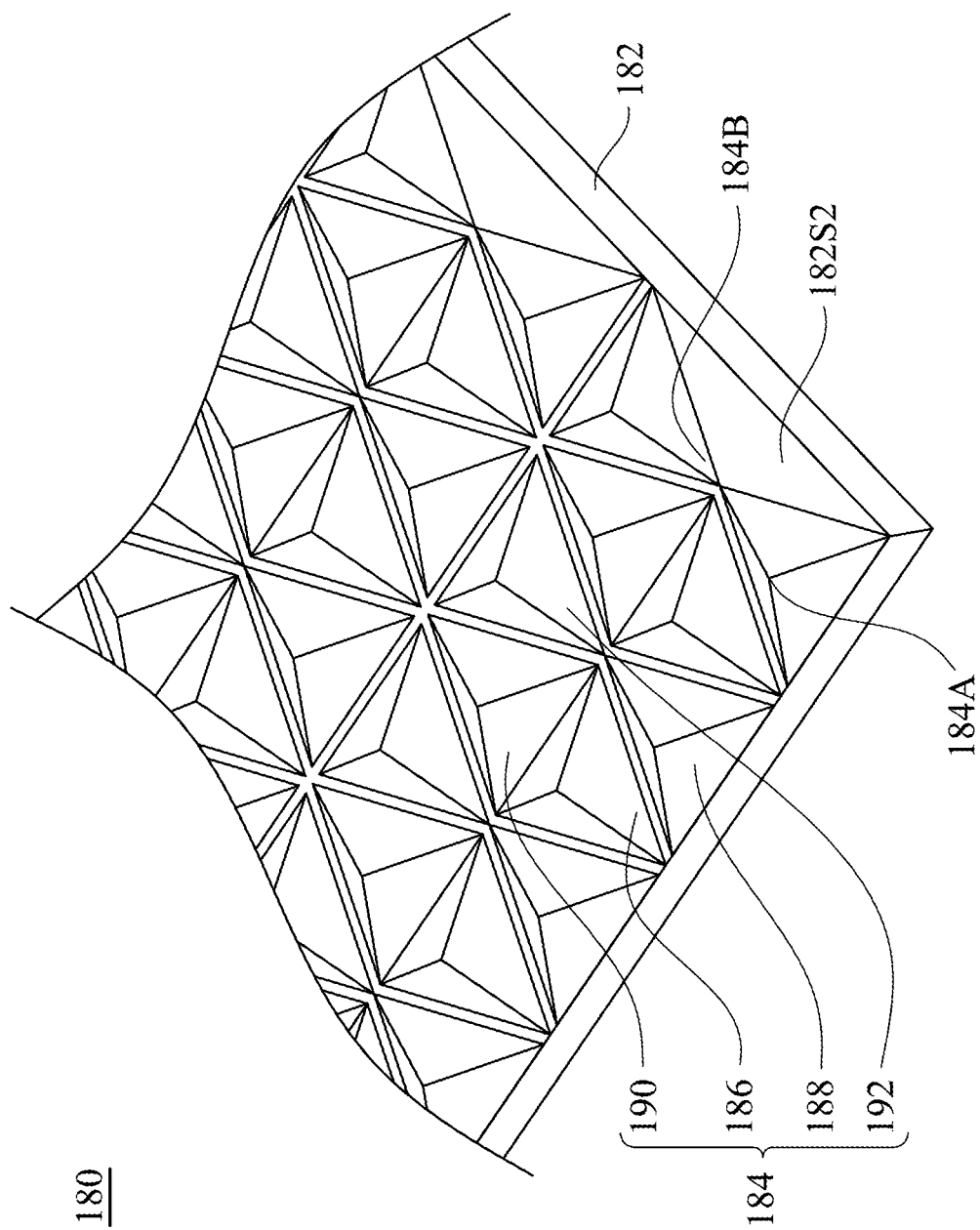
FIG. 9 illustrates a perspective view of the second diffuser in some embodiments of the present disclosure.
Figure 10:
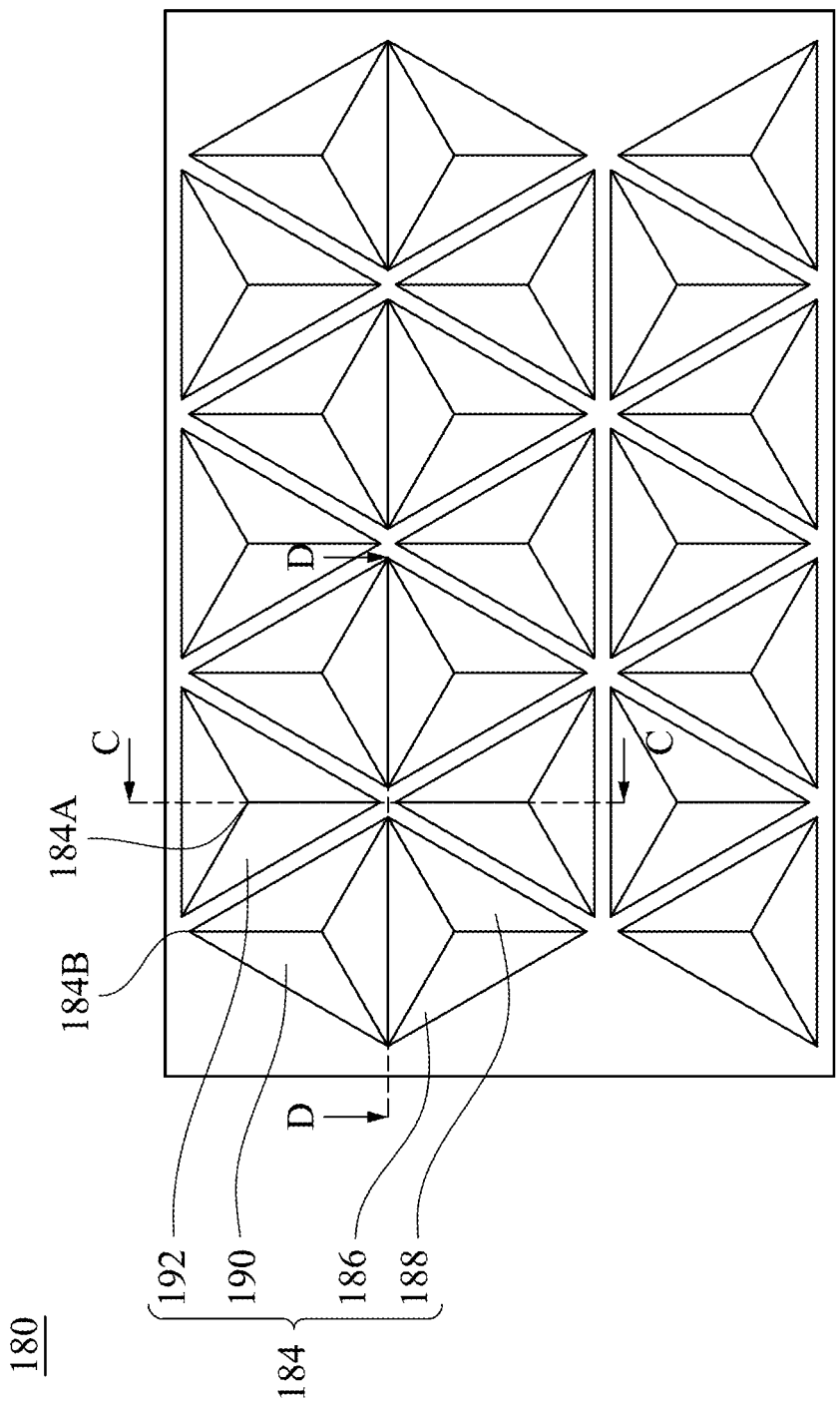
FIG. 10 illustrates a top view of the second diffuser in some embodiments of the present disclosure.
Figure 11:
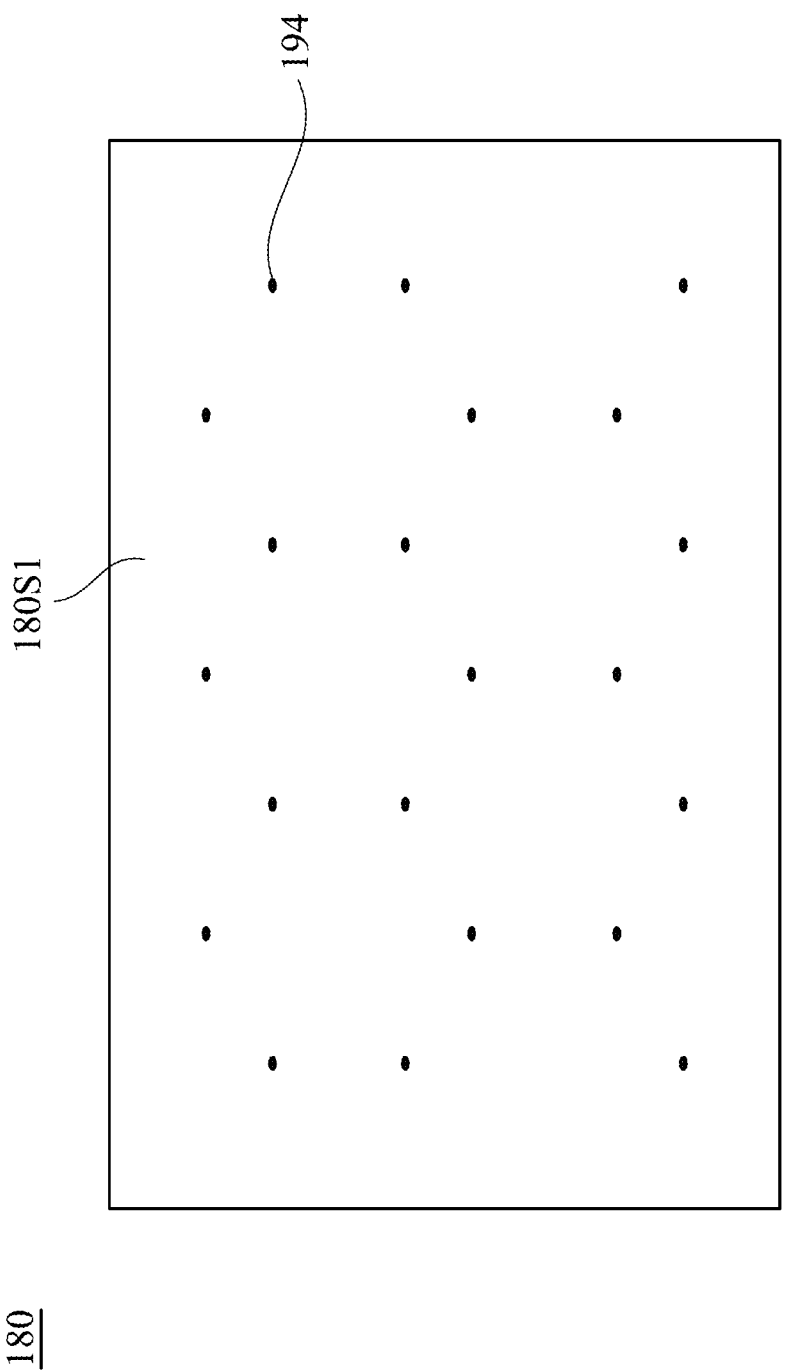
FIG. 11 illustrates a bottom view of the second diffuser in some embodiments of the present disclosure.

FIG. 9 illustrates a perspective view of the second diffuser 180 according to some embodiments of the present disclosure, FIG. 10 illustrates a top view of the second diffuser 180 according to some embodiments of the present disclosure, and FIG. 11 illustrates a bottom view of the second diffuser 180 in some embodiments of the present disclosure. The second diffuser 180 includes a second substrate 182 and a plurality of second ink structures 194. The second ink structures 194 are disposed at a bottom surface 182S1 of the second substrate 182 facing the first diffuser 140, and the locations of second ink structures 194 are directly over the first vertices 144A of the prismatic sub-structures, such as the first prismatic sub-structure 146, the second prismatic sub-structure 148, the third prismatic sub-structure 150 and the fourth prismatic sub-structure 152, of the first prismatic structure 144 respectively. When the light is refracted from the first vertices 144A of the first prismatic structure 144, the second ink structures 194 can diffusely reflect the refracted light back to the first diffuser 140, which improves the scattering and the reflection efficiency of the diffusers.

The arrangement of the second ink structures 194 is shown in FIG. 10. The second ink structures 194 may comprise the same materials as and the first ink structures 154. Therefore, the second ink structures 194 may also include $TiO_2$. The weight percentage of $TiO_2$ in the second ink structures 194 at the bottom surface of the second diffuser 180 can be adjusted based on different situations or applications. In some embodiments, the weight percentage of $TiO_2$ in the first ink structures 154 on the first diffuser 140 is less than the weight percentage of $TiO_2$ in the second ink structures 194 at the bottom surface of the second diffuser 180. In some embodiments, the weight percentage of $TiO_2$ in the second ink structures 194 at the bottom surface of the second diffuser 180 is between about 0.1% and about 0.5%. When the weight percentages of $TiO_2$ in the first ink structures 154 and the second ink structures 194 are within the disclosed range, a better scattered reflection is provided for the light traveling between the first diffuser 140 and the second diffuser 180. A higher weight percentage of $TiO_2$ in the second ink structures 194 of second diffuser 180 than the first ink structures 154 can provide sufficient light transmittance and save certain energy loss of light reflection.

In some embodiments, the second diffuser 180 further includes a second prismatic structure 184, which may include a fifth prismatic sub-structure 186, a sixth prismatic sub-structure 188, a seventh prismatic sub-structure 190 and a eighth prismatic sub-structure 192. The fifth prismatic sub-structure 186, the sixth prismatic sub-structure 188, the seventh prismatic sub-structure 190 and the eighth prismatic sub-structure 192 are arranged on the upper surface 182S2 of the second substrate 182, and the upper surface 182S2 of the second substrate 182 is distal from the first diffuser 140. Each fifth prismatic sub-structure 186 includes a third vertex 184A protruding upwards from the upper surface 182S2 of the second substrate 182 respectively, such as the vertices of the prismatic sub-structures, and a plurality of fourth vertices 184B in contact with the upper surface 182S2 of the second substrate 182. The shapes of the fifth prismatic sub-structure 186, the sixth prismatic sub-structure 188, the seventh prismatic sub-structure 190 and the eighth prismatic sub-structure 192 are similar to the first prismatic sub-structure 146, the second prismatic sub-structure 148, the third prismatic sub-structure 150 and the fourth prismatic sub-structure 152 except the sizes thereof. The sizes of the first prismatic sub-structure 146, the second prismatic sub-structure 148, the third prismatic sub-structure 150 and the fourth prismatic sub-structure 152 may be larger than the sizes of the fifth prismatic sub-structure 186, the sixth prismatic sub-structure 188, the seventh prismatic sub-structure 190 and the eighth prismatic sub-structure 192, and there is no ink structure in the gaps of the second prismatic structures 184 on the upper surface 182S2 of the second substrate 182. In addition, the second substrate 182 and the first substrate 142 may be made of similar or same materials.

As shown in FIG. 7, the arrangement of the second ink structures 194 of the second diffuser 180 is aligned with the first prismatic structure 144 of the first diffuser 140, but is not necessarily aligned with the second prismatic structure 184 of the second diffuser 180. That is, the arrangement of the second ink structures 194 at the bottom surface may not be aligned with the second prismatic structure 184 on the upper surface of the second diffuser 180.

Figure 13:
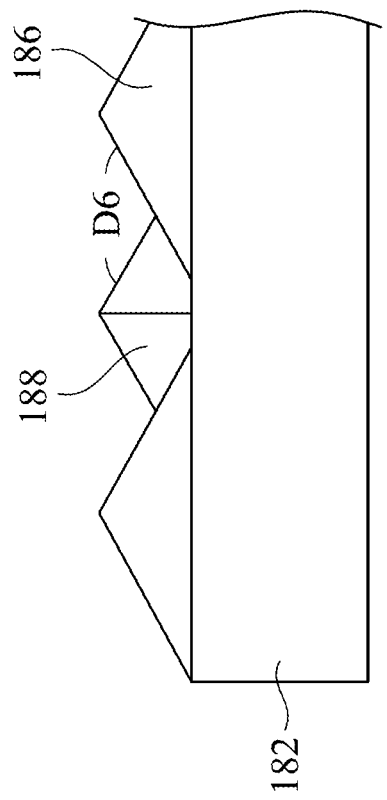
FIG. 13 illustrates the cross-section view of the first prismatic structure taken along line D-D in FIG. 10.
Figure 12:
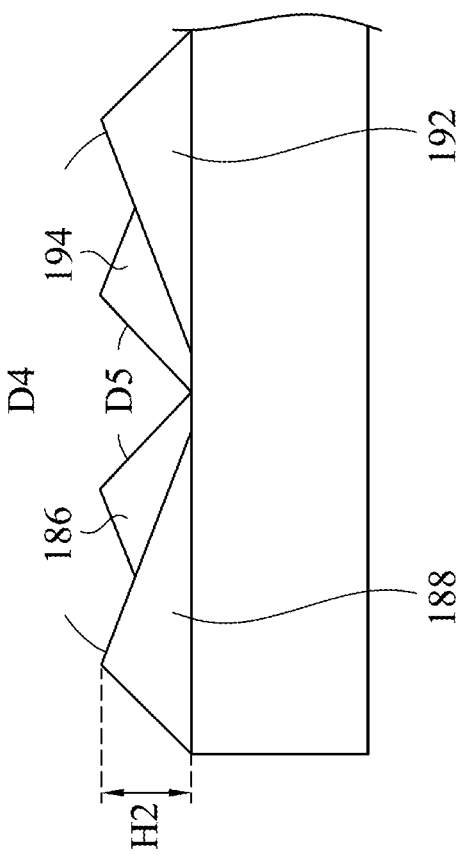
FIG. 12 illustrates the cross-section view of the first prismatic structure taken along line C-C in FIG. 10.

FIGS. 12-13 illustrate side views of the second prismatic structure 184 in some embodiments of the present disclosure. FIG. 12 illustrates a cross-section view of the second prismatic structure 184 taken along line C-C in FIG. 10, and FIG. 13 illustrates a cross-section view of the second prismatic structure 184 taken along line D-D in FIG. 10. It is noted that the second ink structures 194 are not illustrated in FIGS. 12 and 13 for simplicity. In FIG. 12, an angle D4 is between the opposite sides of the adjacent sixth prismatic sub-structure 188 and eighth prismatic sub-structure 192, and an angle D5 is between the opposite sides of the adjacent fifth prismatic sub-structure 186 and seventh prismatic sub-structure 190. In FIG. 13, an angle D6 is between the adjacent sides of the fifth prismatic sub-structure 186 and sixth prismatic sub-structure 188 which are overlapped in the side view. The angle D4, D5 and D6 may be from about 90 degree to about 130 degree. If the angle D4, D5 and D6 are within the disclosed range about 90 to 130 degree, the second diffuser 180 can provide refractions with better light energy distribution effect. In addition, the fifth prismatic sub-structure 186, the sixth prismatic sub-structure 188, the seventh prismatic sub-structure 190 and the eighth prismatic sub-structure 192 have a height H2 between about 0.1 mm and about 0.3 mm.

FIG. 14A illustrates the relative position of the first diffuser 140 and the second diffuser 180. When the display device has two diffusers, such as the first diffuser 140 and the second diffuser 180, the first diffuser 140 may further include some supporting structures 156 as shown in FIG. 14A. The supporting structures 156 are disposed on the upper surface 142S of the first substrate 142 and are adjacent to the first prismatic structure 144. For example, the first diffuser 140 may include at least three supporting structures 156 dispersedly disposed among the first prismatic structure 144. The height of the supporting structure 156 is greater than the height of the first prismatic structure 144. Therefore, the supporting structures 156 are in contact with the bottom surface 182S1 of the second substrate 182 and support the second diffuser 180, such that the first prismatic structure 144 of the first diffuser 140 is not in contact with the second diffuser 180. In other words, the first prismatic structure 144 is separated from the second diffuser 180 by a distance L1. In some embodiments, the bottom surface 182S1 of the second substrate 182 of the second diffuser 180 has a recess 182R, such that the supporting structure 156 can contact or couple with the recess 182R. After the supporting structure 156 contacts or couples with the recess 182R, the first diffuser 140 and the second diffuser 180 are fixed in the relative position. For example, the first prismatic structure 144 of the first diffuser 140 and the second diffuser 180 are kept in a distance, or the second ink structures 194 are correspondingly matched to the first prismatic structure 144. When the distance L1 is kept between the first prismatic structure 144 of the first diffuser 140 and the second diffuser 180, the difference between the refractive index of air and the diffuser provides good refraction effect to the light travelling between the diffusers.

Figure 14D:
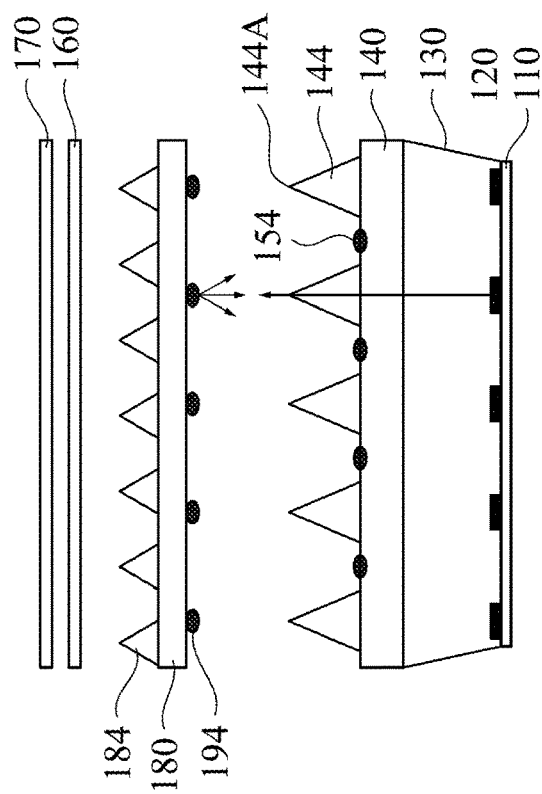
Figure 14C:
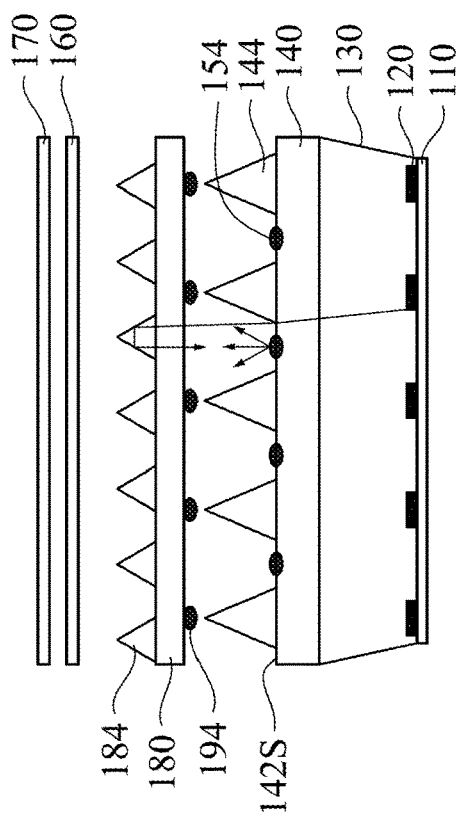

FIGS. 14B-14D illustrate some light paths of the light transmitted from the light-emitting diode chips 120 in the backlight module 200 of the display device. The light of the light-emitting diode chips 120 enters the first diffuser 140 from the bottom surface of the first diffuser 140 and is refracted by the inclined surface of the first prismatic structure 144 as shown in FIG. 14B. Part of the refracted light is reflected back by the diffusing agents in the second diffuser 180, or reflected by the quantum dots in the wavelength conversion film 160 if the second diffuser 180 is not implemented, toward the first diffuser 140. Part of the reflected light enters the first ink structures 154 of the first diffuser 140, the first ink structures 154 may reflect this part of light back to the second diffuser 180, or the wavelength conversion film 160 if the second diffuser 180 is not implemented.

As such, the light emitted by the light-emitting diode chips 120 can be diffusely reflected between the first diffuser 140 and the second diffuser 180, or between first diffuser 140 and the wavelength conversion film 160, thereby improving the light mixing effect of the backlight module and the brightness uniformity of the displayed images.

Besides FIG. 14B, part of the light may pass through a portion of the upper surface 142S of the first diffuser 140, as shown in FIG. 14C, where the first ink structures 154 are not printed on. This part of light passing through the first diffuser 140 may enter the second prismatic structure 184 of the second diffuser 180 and be reflected back to the first ink structures 154 of the first diffuser 140 by the second prismatic structure 184. Moreover, part of the light may pass the first vertex 144A of the first prismatic structure 144 on the first diffuser 140, as shown in FIG. 14D. This part of light may leave the first prismatic structure 144 and directly enter the second ink structures 194, and the second ink structures 194 will diffusely reflect this part of light back to the first diffuser 140. As such, the light emitted by the light-emitting diode chips 120 can be diffusely reflected between the first diffuser 140 and the second diffuser 180, thereby improving the light mixing effect of the backlight module and the brightness uniformity of the displayed images. Moreover, when the display device includes the backlight module 100 or 200 of the present disclosure, the amount of the light-emitting diode chips 120 required in the backlight module 100 or 200 can be effectively reduced while providing same brightness uniformity as the prior art display device with more light-emitting diode chips 120. The manufacturing cost of the display device can therefore be effectively reduced.

Figure 15A:
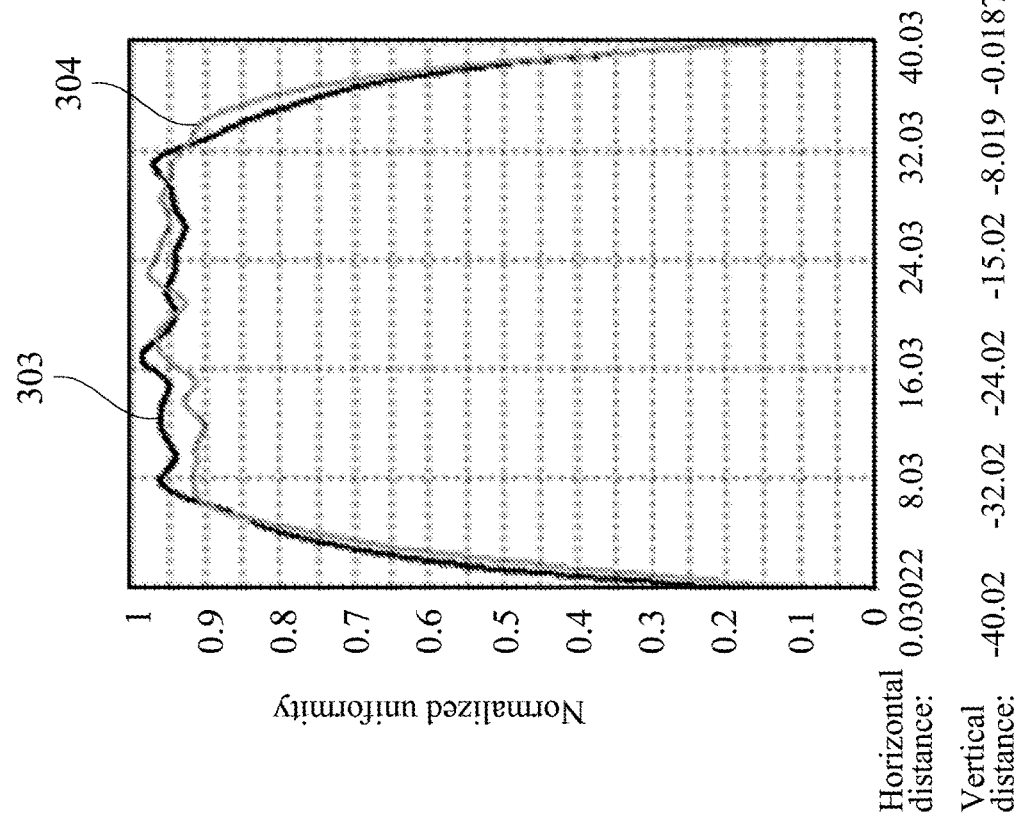
FIG. 15A illustrates the uniformity distribution of the backlight module of the display in prior arts.
Figure 15B:
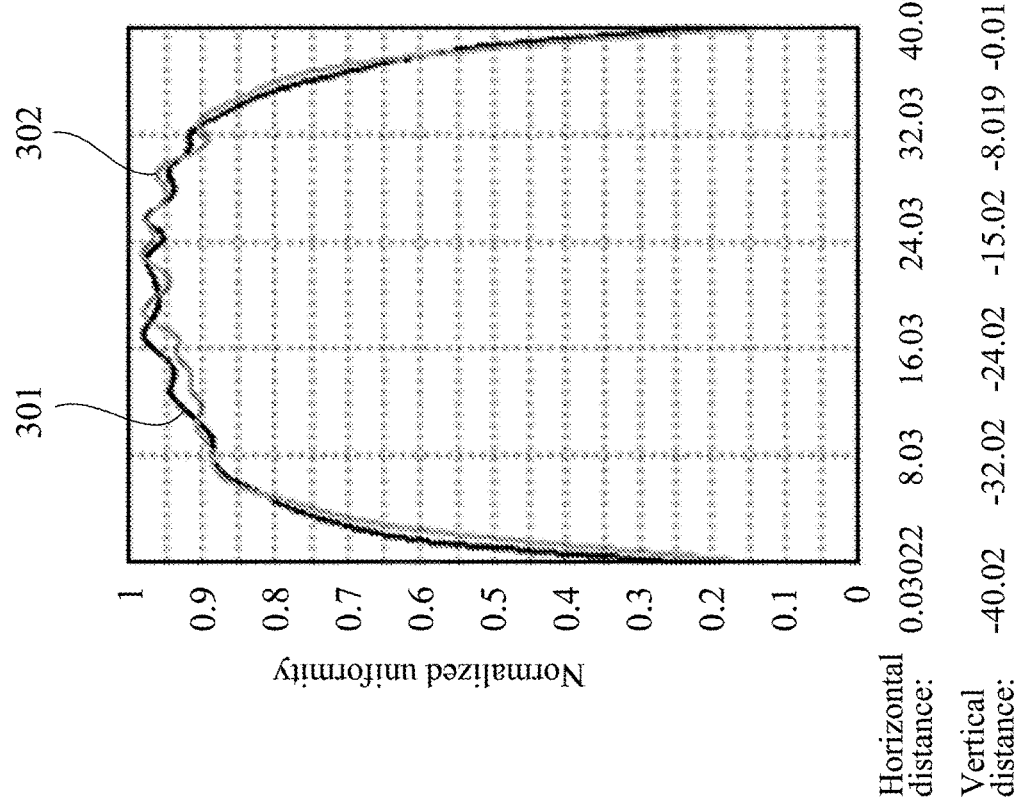
FIG. 15B illustrates the uniformity distribution of the backlight module of the display in some embodiments of the present disclosure.

FIG. 15A illustrates the brightness uniformity distribution in the backlight module of a prior art display device, and FIG. 15B illustrates the brightness uniformity distribution in the backlight module 200 of the display device according to some embodiments of the present disclosure. Y-axis in FIGS. 15A and 15B represents normalized uniformity of brightness, and X-axis in FIGS. 15A and 15B represents horizontal or vertical distance in the backlight modules. In FIG. 15A, curve 301 illustrates the brightness uniformity distribution along horizontal direction in the backlight module of the prior art display device, and curve 302 illustrates the brightness uniformity distribution along vertical direction in the backlight module of the prior art display device. In FIG. 15B, curve 303 illustrates the brightness uniformity distribution along horizontal direction in the backlight module 200 of the display device in some embodiments of the present disclosure, and curve 304 illustrates the brightness uniformity distribution along vertical direction in the backlight module 200 of the display device in some embodiments of the present disclosure. The curves in FIG. 15B, which representing the brightness uniformity in the backlight module 200 of the display device is smoother than the curves in FIG. 15A, which representing the brightness uniformity in the backlight module of the prior art display device. Therefore, the brightness uniformity is improved by the backlight module of the present disclosure and better than the prior arts.

As mentioned above, the backlight module of the display device in some embodiments of the present disclosure has the diffuser with ink structures printed at certain locations. For example, the ink structures of the first diffuser may be printed in the gaps among the first prismatic structure, and the ink structures of the second diffuser may be printed at the locations corresponding to the first vertex of the first prismatic structure. As such, the light emitted from the light-emitting diodes may be scattered and diffusely reflected between the first diffuser and the second diffuser, which can improve the light mixing effect. The brightness uniformity of the backlight module in the display device can thereby be improved. In addition, if the display device has implemented the structures mentioned above, the light-emitting diodes required in the backlight module of the display device can be reduced and the backlight module can still maintain same luminance effect. The manufacturing cost of the display device can thereby be reduced.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the disclosure. In view of the foregoing, it is intended that the present disclosure cover modifications and variations of this disclosure provided they fall within the scope of the following claims.

What is claimed is:

1. A backlight module of a display device, comprising:
a carrier;
a plurality of light-emitting diode chips arranged on the carrier; and
a first diffuser over the carrier and the light-emitting diode chips, wherein the first diffuser comprises:
a first substrate having an upper surface distal from the carrier;
a first prismatic structure at the upper surface of the first substrate, wherein the first prismatic structure comprises a first prismatic sub-structure and a second prismatic sub-structure, the first prismatic sub-structure, the second prismatic sub-structure and the upper surface of the first substrate together define a gap, the first prismatic sub-structure of the first prismatic structure has a first vertex protruding from the first substrate and a plurality of second vertices in contact with the upper surface of the first substrate; and
a plurality of first ink structures in the gap and in contact with the upper surface of the first substrate, wherein the first ink structures are adjacent to at least one of the second vertices.

2. The backlight module of claim 1, wherein the first prismatic structure further comprises a third prismatic sub-structure, a V-shaped recess is formed between the third prismatic sub-structure and the first prismatic sub-structure, and the third prismatic sub-structure and the first prismatic sub-structure are symmetrical with respect to the V-shaped recess.

3. The backlight module of claim 2, wherein the first ink structures are not in the V-shaped recess.

4. The backlight module of claim 1, wherein the first prismatic structure has a plurality of surfaces inclined with respect to the upper surface of the first substrate, and the first ink structures are not on the surfaces.

5. The backlight module of claim 1, further comprising a second diffuser over the first diffuser, wherein the second diffuser comprises:
a second substrate; and
a plurality of second ink structures at a bottom surface of the second substrate facing the first diffuser, wherein the first prismatic sub-structure and the second prismatic sub-structure of the first diffuser have first vertices protruding from the first substrate respectively, and the second ink structures are directly over the first vertices of the first prismatic sub-structure and the second prismatic sub-structure respectively.

6. The backlight module of claim 5, wherein the second diffuser further comprises a second prismatic structure, the second prismatic structure comprises a plurality of fourth prismatic sub-structures arranged at an upper surface of the second substrate, the upper surface of the second substrate is distal from the first diffuser, wherein each of the fourth prismatic sub-structures comprises a third vertex protruding from the upper surface of the second substrate and a plurality of fourth vertices in contact with the upper surface of the second substrate.

7. The backlight module of claim 6, wherein a size of the first prismatic sub-structure of the first diffuser is larger than a size of any of the fourth prismatic sub-structures of the second diffuser.

8. The backlight module of claim 5, wherein the first diffuser further comprises a supporting structure on the upper surface of the first substrate and adjacent to the first prismatic structure, and a height of the supporting structure is greater than that of the first prismatic structure.

9. The backlight module of claim 5, wherein a first weight percentage of $TiO_2$ in the first ink structures in the gap of the first diffuser is lower than a second weight percentage of $TiO_2$ in the second ink structures at the bottom surface of the second substrate.

10. The backlight module of claim 1, further comprising:
a wavelength conversion film over the first diffuser; and
an optical film over the wavelength conversion film.

11. A display device, comprising:
a display panel;
a back plate; and
a backlight module accommodated in a space formed by the display panel and the back plate, wherein the backlight module comprises:
a carrier;
a plurality of light-emitting diode chips arranged on the carrier; and
a first diffuser over the carrier and the light-emitting diode chips, wherein the first diffuser comprises:
a first substrate having an upper surface distal from the carrier;
a first prismatic structure at the upper surface of the first substrate, wherein the first prismatic structure comprises a first prismatic sub-structure, a second prismatic sub-structure, and a third prismatic sub-structure, the first prismatic sub-structure, the second prismatic sub-structure and the upper surface of the first substrate together define a gap, a V-shaped recess is formed between the third prismatic sub-structure and the first prismatic sub-structure, and the third prismatic sub-structure and the first prismatic sub-structure are symmetrical with respect to the V-shaped recess; and
a plurality of first ink structures in the gap and in contact with the upper surface of the first substrate.

12. The display device of claim 11, further comprising a second diffuser over the first diffuser, wherein the second diffuser comprises:
a second substrate; and
a plurality of second ink structures at a bottom surface of the second substrate facing the first diffuser, wherein the first prismatic sub-structure and the second prismatic sub-structure of the first diffuser have first vertices protruding from the first substrate respectively, and the second ink structures are directly over the first vertices of the first prismatic sub-structure and the second prismatic sub-structure respectively.

13. The display device of claim 11, wherein the first ink structures comprise rutile $TiO_2$, anatase $TiO_2$ or combinations thereof.

14. The display device of claim 11, wherein the first prismatic structure has a plurality of surfaces inclined with respect to the upper surface of the first substrate, and the first ink structures are not on the surfaces.

15. A diffuser set, comprising:
a first diffuser, wherein the first diffuser comprises:
a first substrate having an upper surface;
a first prismatic structure at the upper surface of the first substrate, wherein the first prismatic structure comprises a first prismatic sub-structure and a second prismatic sub-structure, the first prismatic sub-structure, the second prismatic sub-structure and the upper surface of the first substrate together define a gap, and the first prismatic structure has a plurality of surfaces inclined with respect to the upper surface of the first substrate; and
a plurality of first ink structures in the gap and in contact with the upper surface of the first substrate, wherein the first ink structures are not on the surfaces inclined with respect to the upper surface of the first substrate.

16. The diffuser set of claim 15, further comprising a second diffuser over the first diffuser, wherein the second diffuser comprises:
a second substrate; and
a plurality of second ink structures at a bottom surface of the second substrate facing the first diffuser, wherein the first prismatic sub-structure and the second prismatic sub-structure of the first diffuser have first vertices protruding from the first substrate respectively, and the second ink structures are directly over the first vertices of the first prismatic sub-structure and the second prismatic sub-structure respectively.

17. The diffuser set of claim 16, wherein a first weight percentage of $TiO_2$ in the first ink structures in the gap of the first diffuser is lower than a second weight percentage of $TiO_2$ in the second ink structures at the bottom surface of the second substrate.

18. The diffuser set of claim 16, wherein the first prismatic structure of the first diffuser and the second diffuser are kept in a distance.

19. The diffuser set of claim 15, wherein the first ink structures comprise rutile $TiO_2$, anatase $TiO_2$ or combinations thereof.

* * * * *